Patented June 2, 1942

2,284,978

UNITED STATES PATENT OFFICE 2,284,978

METHOD OF PREPARING MAGNESIUM THEOPHYLLINE

Philip A. Kober, Detroit, Mich., assignor to G. H. Sherman, M. D., Incorporated, Detroit, Mich., a corporation of Michigan No Drawing. Application March 6, 1939, Serial No. 259,950

1 Claim. (Cl. 260—253)

This invention relates to methods of preparing pharmaceutical products and particularly to methods for effecting a chemical combination of magnesium and theophylline to produce a new product. To such product there has been directed my copending application Serial No. 259,951, filed March 6, 1939.

Theophylline, as described in the United States Dispensatory (22nd edition, 1937, page 1105), is "a white crystalline powder without odor and having a bitter taste," and used chiefly as "a remedy of circulatory and renal disorders." The more common of such disorders are angina pectoris, hypertension, coronary sclerosis, coronary thrombosis, cardiac decompensation, and asthma.

It has been the practice to administer theophylline either alone or mixed with certain other compounds and salts intended to increase its solubility. Thus the U. S. Dispensatory (loc. cit.) mentions on pages 1106 and 1107, ethylene diamine and sodium acetate for use with theophylline. Such alkaline preparations, however, may produce gastric irritation, if administered orally, as appears from a statement in "New and Nonofficial Remedies of the American Medical Association," 1937, page 475.

Magnesium is useful in substantially the same therapeutic field as theophylline, namely in the treatment of circulatory and renal diseases. In medical literature, there appears considerable recognition of such usefulness, the following examples being given.

H. H. Lissner (California & Western Medicine, 40, 330, 1934), H. H. Zolman and B. Sternberg (Annals of Internal Medicine, 7, 643, 1933) obtained a distinct ameliorating effect upon the symptoms of hypertension by the intravenous administration of magnesium sulphate. N. Pines (Lancet, 1, 577, 1933) secured good results in many cases of angiospasm by the intravenous use of magnesium. M. Bandman (Zeitschrift für klin. Med. 124, 1, 1933) treated fifty angina pectoris patients with magnesium sulphate therapy and obtained considerable improvement in twenty-nine and a temporary improvement in eight more of the patients. V. G. Haury (Proceedings of Soc. for Exp. Biol. & Med. 38, 233, 1938) demonstrated that magnesium is capable of acting as a broncho-dilator in guinea pig lungs.

An object of the invention is to provide a commercially practical method for chemically combining magnesium and theophylline as a product yielding the therapeutic advantages of both.

Another object is to accomplish the formation of a new product, magnesium theophylline, by a chemical method avoiding any contamination of such product by other precipitates.

A further object is to produce magnesium theophylline by a chemical method that will not be disturbed by an excess of reagents employed.

The new product, magnesium theophylline, is a white crystalline substance, only slightly soluble in water and combining the therapeutic values of theophylline and magnesium, its crystals being exceedingly small as produced in accordance with the method herein disclosed. Analysis of this product shows its composition to be substantially as follows:

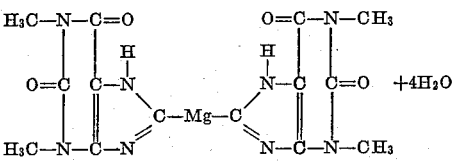

Or the composition may be expressed by the more simple formula: $(Mg(C_7H_7N_4O_2)_2 \cdot 4H_2O$.

In attacking the problem of combining theophylline and magnesium, the slightly acid properties of the former led to the conclusion that neutralization of magnesium hydroxide with theophylline would be a logical, if not the only, way of obtaining the desired reaction. I produced magnesium theophylline initially by boiling a theophylline solution with a gram equivalent quantity of magnesium hydroxide in suspension, the new product being gradually crystallized out of the liquid. This method, however, additionally effects a considerable precipitation of magnesium hydroxide. A similar procedure can be used in effecting synthesis of magnesium theophylline by using magnesium carbonate or magnesium basic carbonate in place of magnesium hydroxide.

From the above-mentioned experiment followed the conception of securing a reaction between a solution of theophylline in ammonia water and a dissolved magnesium salt, as for example, the chloride or sulphate. The advantages presented by this procedure lie in bringing together the magnesium salt, theophylline, and hydroxide ions as a clear solution, from which magnesium theophylline may crystallize out, leaving in solution any excess of theophylline or of the magnesium salt. From this reaction there resulted a large yield of magnesium theophylline, free of any other precipitate. In securing this reaction, it was not known and could not have been deduced that ammonium hydroxide in excess of the amount required as a solvent would not interfere with formation of the desired product, and would not result in a precipitation of magnesium hydroxide. It proved to be the fact, however, that no detriment results from an excess of the hydroxide.

A preferred procedure is more definitely exemplified, as follows. Suspend 100 grams of theophylline in 500 cubic centimeters of water. Add sufficient concentrated ammonia water to dissolve the theophylline, preferably stirring the solution while so doing. Approximately 50 cubic centimeters of the concentrated ammonia water is adequate. There is now added to the solution, preferably while agitating the same, 2500 cubic centimeters of an $$\frac{n}{10}$$

magnesium salt solution, as for example the sulphate or chloride solution. A heavy precipitate of magnesium theophylline promptly results, amounting in the exemplified procedure to 105 grams, after filtering, washing, and drying.

The procedure described is susceptible of considerable modification within the scope of the invention. In place of ammonia there may be used, with substantially the same results, various other alkaline amines, such as ethylene diamine, triethylamine, and triethanolamine. Also the sulphate or chloride of magnesia may be replaced by such salts of relative weak acids, as the acetate, lactate, and citrate of magnesia.

It is quite possible that a substantial yield of magnesium theophylline may be obtained, within the scope of the present invention by varying certain conditions of the described reaction, such as the concentration of the reagents, alkalinity or hydrogen ion concentration of the solution, temperature, extent of magnesium ionization. etc. In the event that any practice of the invention results in an admixture with the desired product of an appreciable amount of free theophylline, the latter may be dissolved out by washing the product with faintly alkaline water, lacking strength to dissolve magnesium theophylline.

Magnesium theophylline in tablet form can be swallowed without taste, unless retained in the mouth unduly long, and without gastric irritation, as shown by clinical trial. Because the solubility in water is slight its therapeutic action is prolonged, as it is well known in medicine that low solubility prolongs absorption and therefore therapeutic action. However, prompt action is apparent from the fact that a tablet allowed to disintegrate in the mouth shows the strong bitter taste of theophylline quickly.

The invention is presented as including all such modifications and changes as come within the scope of the following claim.

What I claim is:

The method of preparing magnesium theophylline which consists in allowing theophylline to react with an ionizable magnesium compound in the presence of an aqueous alkaline solution, and washing the product with faintly alkaline water to dissolve out any free theophylline.

PHILIP A. KOBER.